G. D. PRENTICE.
KEG RINSER.
APPLICATION FILED NOV. 28, 1910.

1,015,585.

Patented Jan. 23, 1912.
6 SHEETS—SHEET 3.

G. D. PRENTICE.
KEG RINSER.
APPLICATION FILED NOV. 28, 1910.

1,015,585.

Patented Jan. 23, 1912.
6 SHEETS—SHEET 5.

UNITED STATES PATENT OFFICE.

GEORGE D. PRENTICE, OF MILWAUKEE, WISCONSIN.

KEG-RINSER.

1,015,585.  Specification of Letters Patent.  Patented Jan. 23, 1912.

Application filed November 28, 1910. Serial No. 594,505.

*To all whom it may concern:*

Be it known that I, GEORGE D. PRENTICE, a citizen of the United States, residing at Milwaukee, county of Milwaukee, and State of Wisconsin, have invented new and useful Improvements in Keg-Rinsers, of which the following is a specification.

My invention relates to improvements in machines for rinsing kegs, and it pertains to that class which are adapted to be used with water under pressure.

The object of my invention is to provide a machine by which a water controlling valve is automatically opened by the gravity of the keg to be rinsed, and the water supply is used for the two fold purpose of rinsing the kegs and removing them from the machine, whereby the operator has simply to place a keg upon the machine when a water controlling valve will be automatically opened and the keg will be rinsed and automatically removed, whereby the manual labor of cleansing kegs is reduced to the minimum.

My invention is further explained by reference to the accompanying drawings, in which—

Like parts are identified by the same reference numerals throughout the several views.

1 is a tilting lever, upon which a keg 2 is placed, preparatory to being rinsed. The lever 1 is pivotally supported from the sides of the frame 19, by the bolt 4 in such a manner that its front end is adapted to be tilted downwardly by the gravity of the keg, when it is placed thereon, whereby motion is communicated from the front end of the lever 1 to the water controlling valve 5, through the stem 6, the protruding end 7 of which rests against the front end of the tilting lever, whereby said valve is opened and water is admitted from the duct 8; through the valve chamber 9, channel 10 and spray nozzle 11 to the interior of the keg 2, as more clearly shown in Fig. 4, whereby the interior of the keg is thoroughly rinsed.

Figures 7, 8:
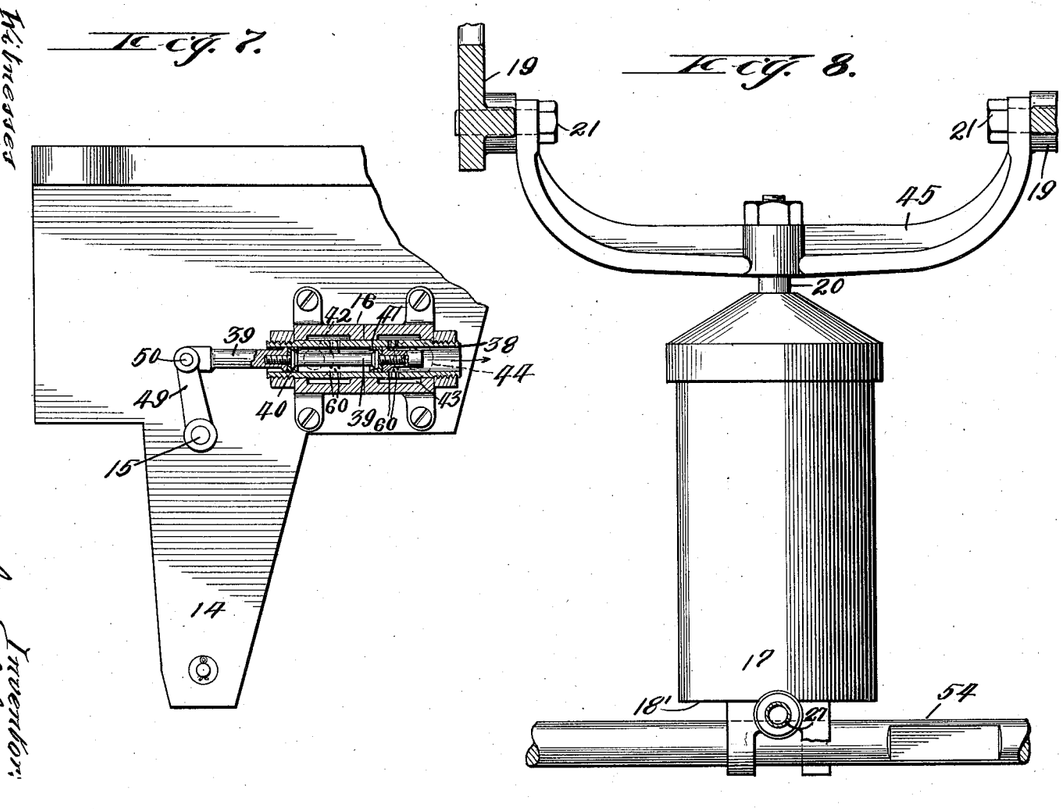
Fig. 7 is a longitudinal section of the water controlling valve.
Fig. 8 is a front view of the hydraulic lift, by which the power of the water is utilized for raising and discharging the kegs from the machine after they have been rinsed.

The nozzle 11 is of such dimensions that it loosely fits the bung hole 12 of the keg, whereby a portion of the water which has been used in rinsing the keg flows back through the bung hole into an oscillating tank 13. The oscillating tank 13 is pivotally supported from the frame member 14 on the pivotal shaft 15, in such a manner that as said tank becomes filled with water, it is tipped downwardly by the gravity of the water therein, and its contents discharged, when by the movement of said oscillating tank 13, the pivotally supported shaft 15 is turned a partial revolution, when motion is communicated through said shaft to the water controlling valve mechanism 16, whereby water is conducted under pressure from said valve mechanism 16 to the lower end of the so called hydraulic lift 17 beneath the piston 18, whereby said piston is raised, when motion is communicated from said piston 18 to the tilting frame 19, through the piston rod 20, the protruding end of which is pivotally connected with the frame 19 through the pivotal bolts 21, whereby as the front end of said frame is raised, the keg 2 is also raised to the position indicated by dotted lines 22 in Fig. 1, when it rolls of its own gravity down the inclined frame 19 and is thereby removed from the machine. As the keg 2 rolls down the inclined frame 19, as indicated in said Fig. 1, it is brought in contact with the upper arm of the lever 23, whereby the upper arm of said lever 23 is forced downwardly by the gravity of the moving keg, whereby the lower arm 24 of said lever is thrown upwardly, when motion is communicated from the lower arm 24 of the lever to the tilting tank 13, through the flexible member 25, whereby said tilting tank 13 is drawn back from the position indicated by dotted lines in Fig. 1, to its normal position shown in Figs. 2 and 4. As the tilting tank 13 is thus drawn back to its normal position, the pivotally supported shaft 15, which is adapted to be turned by the movement of said tank, is revolved a partial revolution in the opposite direction, whereby the reciprocating valve 16, shown in Fig. 7, is reversed and the supply of water to the hydraulic lift 17 is cut off, when the piston is forced back to the lower end of the cylinder 18' by the gravity of the frame 19, when the machine is ready for the reception of another keg.

Water is led to the hydraulic lift 17 from the main supply duct 8, through the duct 26, said duct 26 being connected at one end with the lower end of the cylinder 18' by the threaded coupling 27, and at its opposite end with said main duct 8 through the valve mechanism 16. It will be understood that as the water flows from the keg 2, it first passes into the receptacle 29, when a portion of such water escapes from the machine through the passage way 30, while the remaining portion of the water passes from said receptacle 29 through the overflow passage 31, when it passes from thence into the tilting tank 13 below. The relative quantities of water that are thus permitted to escape and which are led to the tilting tank, are governed by the adjustment of the segmental flange 32. It will be understood that when said flange 32 is adjusted so as to partially or entirely close the passage way 30, the greater portion of the water will flow through the passage way 31 into the tilting tank, whereby the tilting tank will be more quickly filled, when the machine will be more quickly operated, whereby a keg will be permitted to remain upon the supporting platform a shorter period of time. When, however, the segmental flange 32 is moved in the opposite direction, a larger quantity of water will be permitted to escape and a less quantity will be led to the tilting tank 13, whereby the machine will be operated less frequently and as a consequence, the keg will be permitted to remain upon the supporting frame a greater length of time. Thus it is obvious that by the adjustment of the segmental flange 32, the machine will be caused to operate more or less rapidly, as required, it being understood that under a high pressure of water, the keg may be more rapidly cleansed and as a consequence, it will be necessary to operate the machine more rapidly. When, however, the machine is operated under a lower pressure, said segmental flange is adjusted so that the machine will operate less rapidly and as a consequence, the discharge of water into the keg will be prolonged a greater length of time.

The lever 23 is pivotally supported from the tilting frame 19, by the pivotal shaft 33.

The frame 19 is pivotally supported from the stationary frame 34, by the pivotal bolts 35. The valve 5 is normally retained in its closed position by the recoil of the spiral spring 36, one end of which spring rests upon the lower end of the valve chamber 9, while its upper end bears against the under side of the valve 5, whereby said valve 5 is normally retained against its seat 37, and is adapted to be opened by the downward pressure of the keg upon the pivotally supported lever 1, as stated.

The water controlling valve mechanism 16 comprises the valve cylinder 38, valve stem 39, and the cup valves 40 and 41. When the valve stem is moved toward the left in the position shown in Fig. 7, the water which enters said valve cylinder through the duct 42 is retained therein by the cup valve 41. When, however, the valve stem 39 is moved in the opposite direction, the water which enters the valve cylinder 38, passes from said cylinder into the outlet chamber 43, when it escapes through the port 44, and is led from thence through the duct 26 to the lower end of the cylinder 18' of the hydraulic lift.

The piston rod 20 of the hydraulic lift is connected with the frame 19 through the yoke 45 and pivotal bolts 21, 21, whereby as said piston 18 is moved upwardly, motion is communicated therefrom to the frame 19 through said piston rod 20, yoke 45 and pivotal bolts 21. When the tilting tank 13 is filled with water and is thrown down by the gravity thereof, it moves a partial revolution upon its supporting shaft 15 without communicating motion thereto and until its lower side 47 is brought in contact with the lower arm of the oscillating lever 48, when the arm 48 is moved a slight distance only, thereby communicating a partial revolution to said supporting shaft 15, with which it is rigidly connected, whereby motion is communicated from said shaft 15 to the water controlling valve mechanism 16, through the arm 49 and pivotal bolt 50. When, however, said tilting tank 13 is brought back to its normal position, as previously described, its rear wall 51 is brought in contact with the upper arm 52 of said oscillating lever, whereby said shaft 15 is revolved a partial revolution in the opposite direction, when motion is communicated therefrom through said arm 49 and pivotal bolt 50 to said valve mechanism 16, when the position of the valves therein is reversed.

Figure 4:
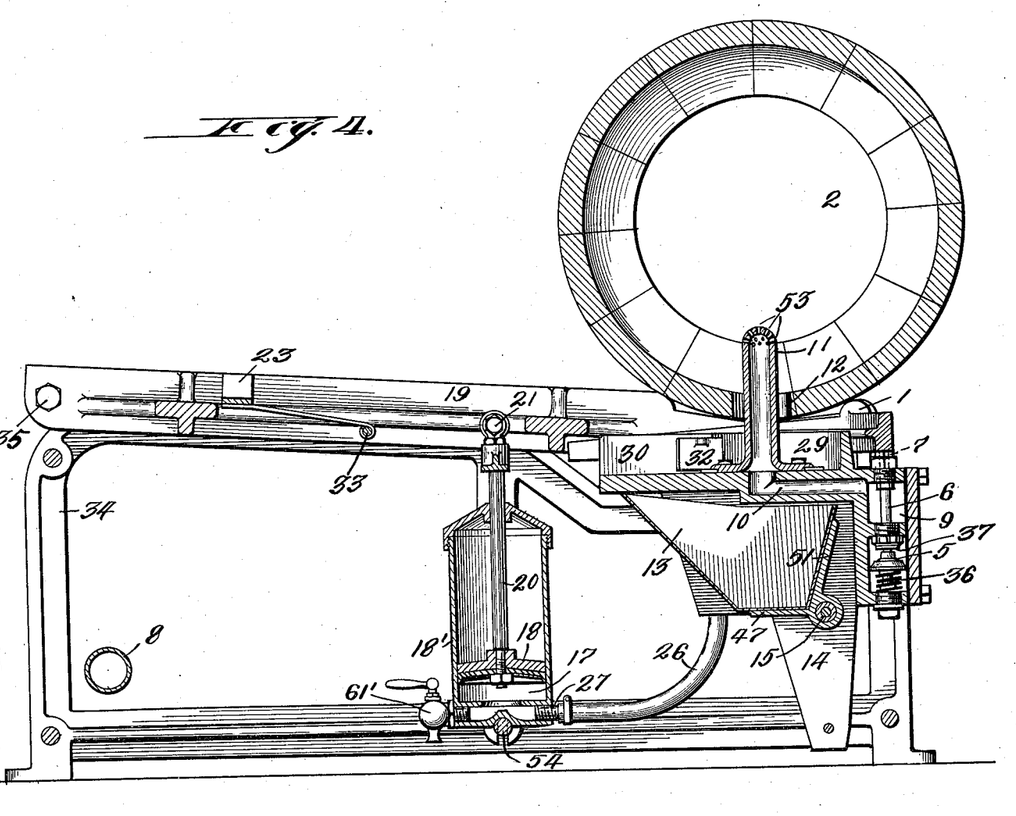
Fig. 4 represents a longitudinal section of the machine, also showing the keg in position to be rinsed.
Figure 5:
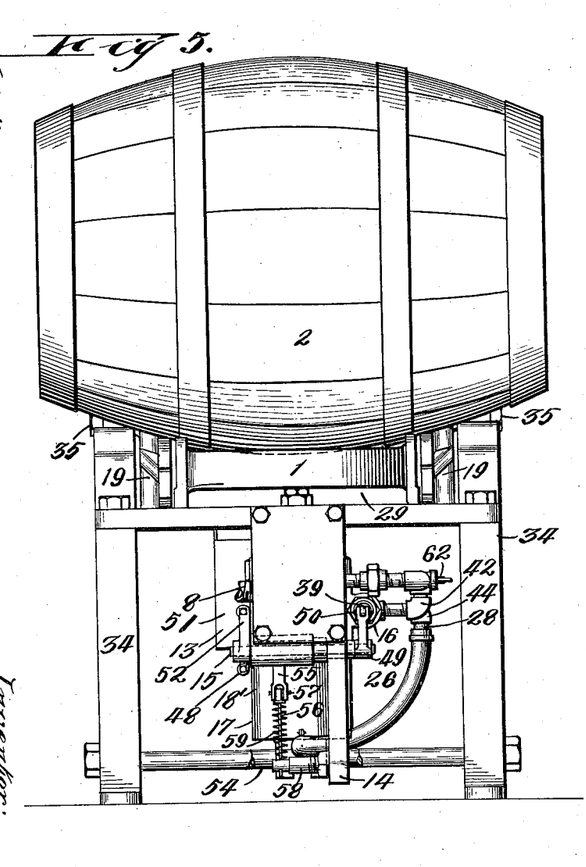
Fig. 5 is an end view.
Figure 6:
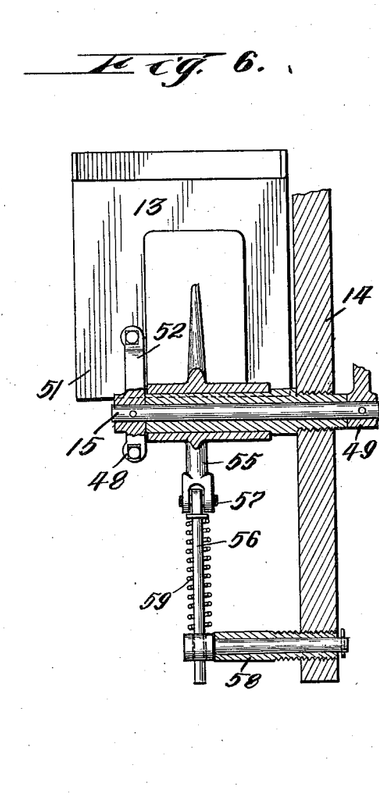
Fig. 6 is a detail of the valve operating mechanism, part in section.

The nozzle 11 is preferably provided with a plurality of spray apertures 53, through which the water is discharged therefrom in a spray against the inner wall of the keg, as shown in Fig. 4. In view of the fact that the cylinder 18' of the hydraulic hoist is caused to oscillate forwardly and backwardly slightly as the piston therein is moved upwardly and downwardly, it becomes necessary to pivotally connect the same at its lower end with the supporting frame. 54 is a pivotal shaft by which the lower end of the cylinder 18′ of the hoist is pivotally connected with the lower member of the supporting frame 34.

To provide for retaining the tilting tank 13 in its normal upright position until nearly or quite filled with water, it becomes necessary to yieldingly support the same in such position, while it is being filled, and to accomplish such object, I have provided the same with a radial arm 55, which is pivotally connected with the rod 56 by the bolt 57 and the lower end of said rod 56 is slidably connected with the shaft 58, which shaft 58 is rigidly supported at its opposite end from the frame member 14. The shaft 58 serves as a support for the lower end of the spring 59, and said spring is yieldingly supported between said shaft 58 and the upper end of said rod 56, said spring being adapted by its recoil to bear upwardly against the radial arm 55, acting through said pivotal bolt 57, whereby said tilting tank is retained in its normal position until nearly filled with water. When, however, the tilting tank has become nearly or quite filled with water, it is moved downwardly by the gravity of the same, whereby the spring 59 is compressed until said arm 55 has passed the central point between the pivotal support 15, of said tank, and the pivotal support 58 of said rod 56. When the radial arm 55 passes said central point, it is thrown up upon the opposite side thereof by the recoil of said spring, when said tank is retained in its lower position until thrown back to its normal position, shown in Fig. 2, by the gravity of the keg as it is being removed from the frame, as previously described. It will be understood that by this arrangement, the shaft 15 will remain at rest until the tilting tank 13 has been filled and brought in contact with the lower arm 48 of the shaft actuating lever. That as soon as the tilting tank has been brought in contact with said lower arm, a partial revolution is communicated therefrom, as stated, to said shaft 15, said shaft is turned a partial revolution and the valves connected therewith are operated, as previously described.

It will be understood that as the piston 18 moves downwardly to the lower end of the cylinder, it becomes necessary to permit the water in such cylinder to escape and such water is returned from said cylinder to the valve mechanism 16 through said duct 26, when it enters the chamber 43 upon the right hand side of the piston 41, when it escapes from said valve chamber 43 to the exterior, through the open end of the cylinder 38 as indicated by the arrow upon the right.

The walls of the cylinder 38 are provided with a plurality of radial apertures 60, through which the water passes from the inclosing chambers to and from said cylinder.

Figure 1:
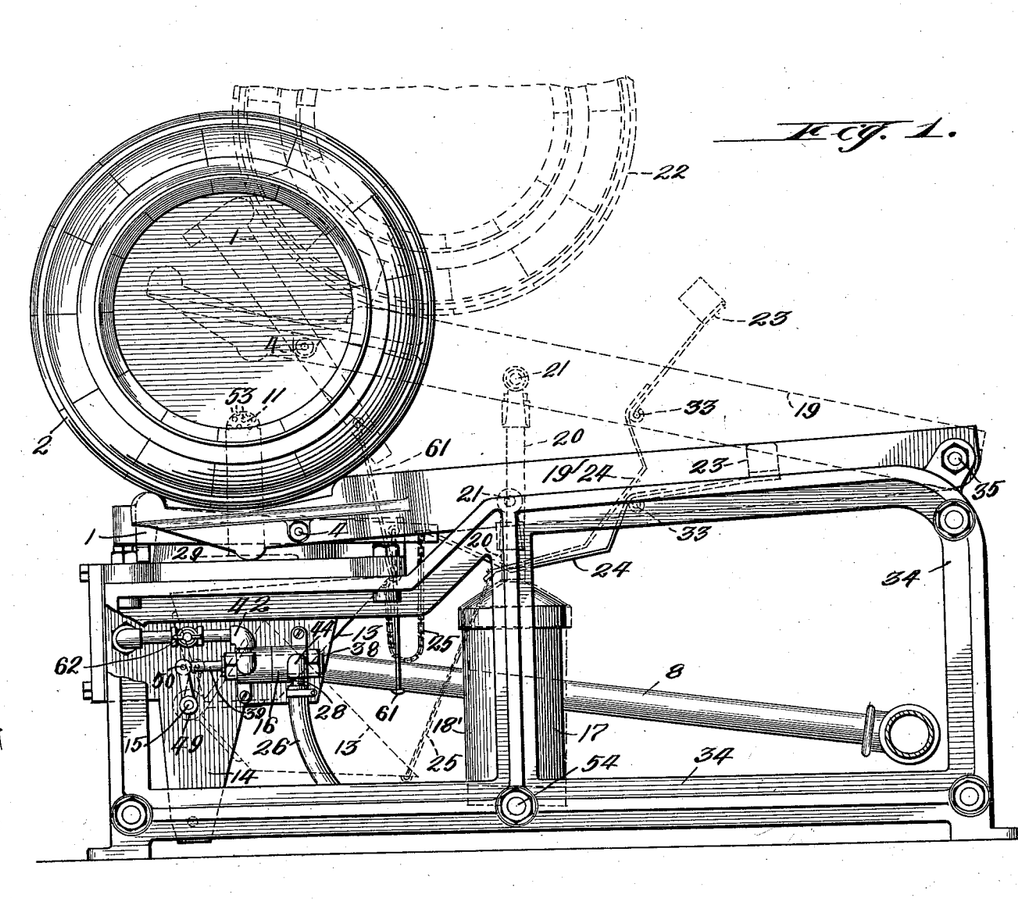
Figure 1 represents a side view of the machine showing the keg in position to be rinsed.
Figure 2:
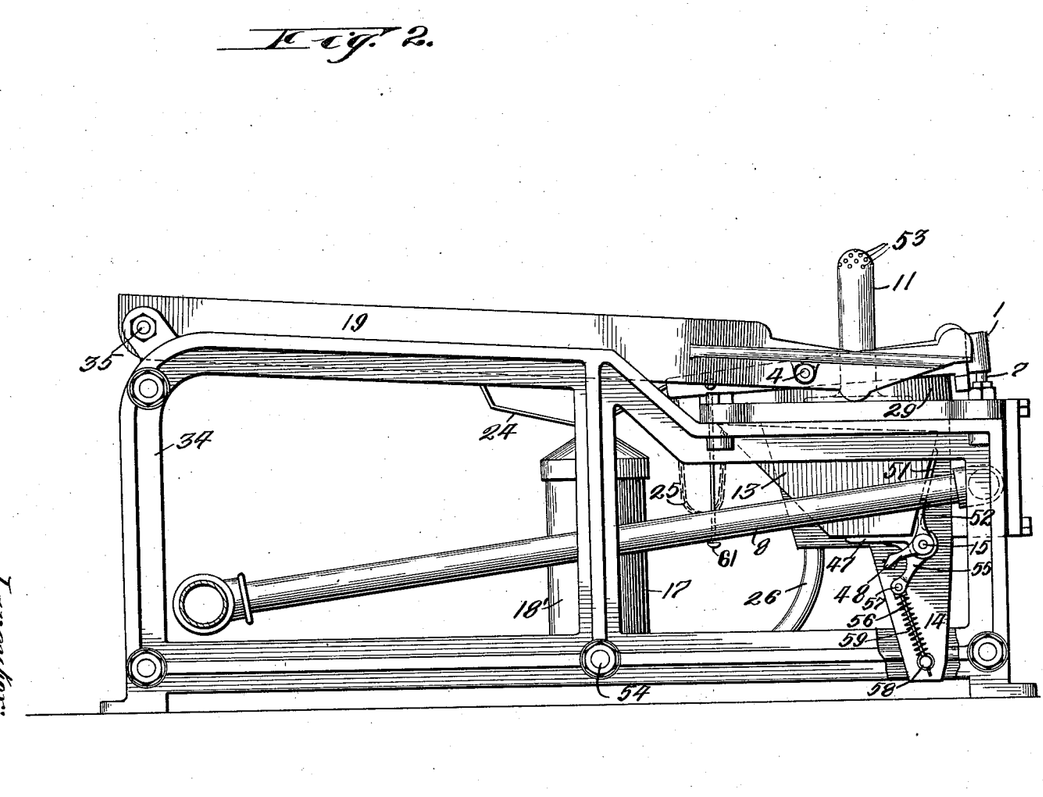
Fig. 2 is also a side view of the machine from its opposite side.
Figure 3:
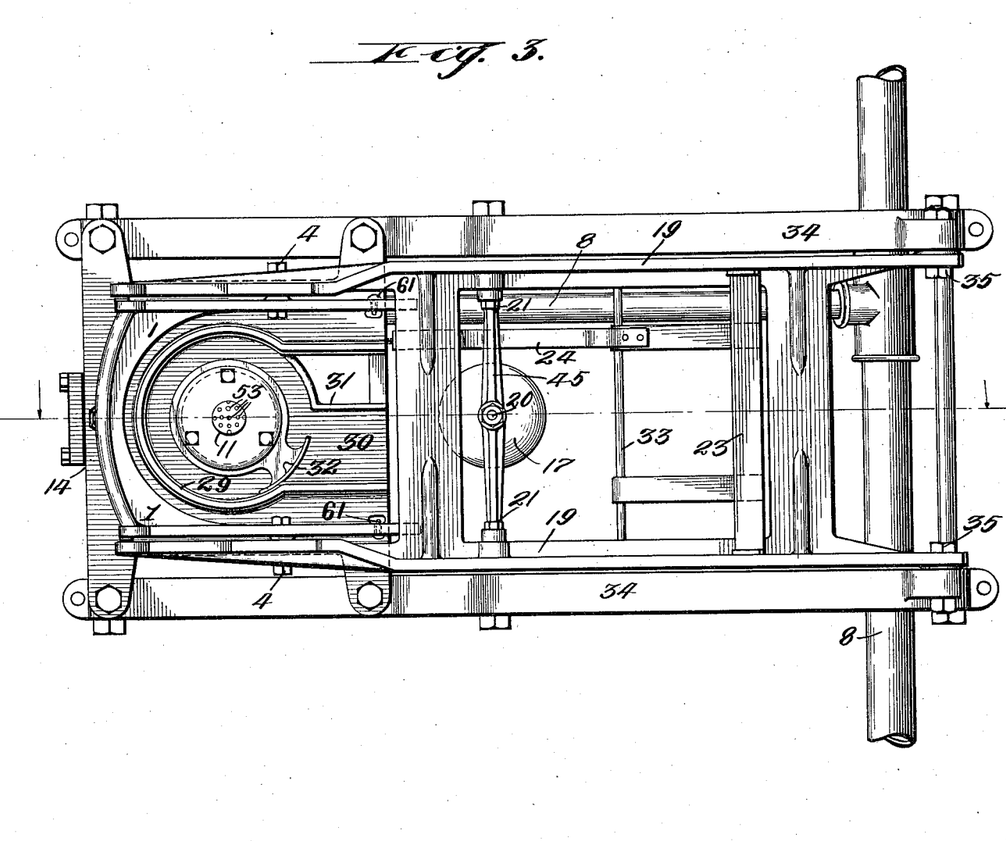
Fig. 3 is a plan view of the machine.

As a means of starting the keg from the front end of the pivotally supported frame 19, after the same has been raised to the position indicated in dotted lines in Fig. 1, I have connected the rear end of the keg supporting lever 1 with a stationary portion of the main frame 34, through the link 61, said link 61 being pivotally connected at its upper end with the rear end of said lever 1, and also slidably connected at its lower end with a stationary portion of the main supporting frame, as shown in Fig. 1, whereby as said tilting frame 19 is raised, the rear end of said lever 1 is held by said link, as indicated in said Fig. 1, whereby its opposite end is thrown upwardly, as shown in dotted lines in said Fig. 1, and the keg thereby discharged from the machine. It will of course be understood that when the pivotally supported frame 19 is brought back to the horizontal position, shown in Figs. 2 and 4, the lever 23 which has previously been thrown rearward by the weight of the keg passing over it, is brought back and permitted to remain in its normal position shown in Figs. 2 and 4, until said tilting frame is again raised.

61′ is a pet cock, which is connected with the lower end of the cylinder 18′, through which water may be withdrawn from the cylinder, when the machine is not in use.

62 is a valve, by which the admission of water to the valve mechanism 16 and from thence to the hydraulic lift, is controlled and regulated. It will be understood that if the valve 62 were left wide open under a high water pressure, the keg will be too rapidly thrown from the supporting levers and for this reason, it becomes important to be able to control the admission of water through the valve mechanism leading to said cylinder.

Having thus described my invention, what I claim as new, and desire to secure by Letters Patent, is—

1. In a machine for rinsing kegs, the combination of a stationary frame, a nozzle vertically supported from said frame, a water duct leading from a water supply to said nozzle, a frame pivotally supported from said stationary frame, a lever pivotally supported from said pivotally supported frame in close proximity to said nozzle, a water controlling valve located in said duct beneath said lever, said lever being adapted to be actuated by the weight of the keg when placed thereon around said nozzle, and said valve being adapted to be operated by said lever, whereby water is admitted through said nozzle into said keg, means actuated by the pressure of the water from the supply for raising one end of said pivoted frame after the keg is cleansed, a valve for controlling the flow of water to said frame raising means, and means actuated by the keg as it is rolled from the pivoted frame, for opening said last named water controlling valve, whereby the tilting frame is returned to its normal position.

2. In a machine for rinsing kegs, the combination of a spray nozzle, a water duct communicating from the water supply to said nozzle, a water controlling valve located in said duct, a stationary frame, a frame pivotally connected at one end to said stationary frame, a lever pivotally connected to said pivoted frame and adapted to bear at one end upon the protruding stem of said valve, a hydraulic hoist for the pivoted frame, comprising a cylinder and piston, one of the members of said hoist being connected with said stationary frame, and the other member with said pivoted frame, a water duct communicating from said water supply with said hoist, a valve controlling the flow of water through said last named duct, a tilting lever, means connected with said tilting lever for operating said last named valve, whereby as a keg is placed upon said nozzle, said lever will be forced down, said first named valve will be opened, and said keg will be rinsed, automatically raised, and discharged from the machine.

3. In a machine for rinsing kegs, the combination of a spray nozzle, a water duct communicating from the water supply to said nozzle, a water controlling valve located in said duct, a stationary frame, a pivoted frame pivotally connected at one end to said stationary frame, a lever pivotally connected at one end to said pivoted frame and adapted to bear at its opposite end upon the protruding stem of said valve, a hydraulic hoist for the pivoted frame, a water duct communicating from said water supply with said hoist, a valve controlling the flow of water through said last named duct, a tilting tank pivotally supported below said nozzle and adapted to be operated by the gravity of the water received from said keg, means for communicating motion from the pivotal support of said tilting tank to said last named valve, whereby as said tilting tank is operated by the gravity of water therein, said last named valve will be opened, said hoist will be actuated, one end of said pivoted frame will be elevated, and said keg will be discharged therefrom.

4. In a machine for rinsing kegs, the combination of a spray nozzle, a water duct communicating from the water supply to said nozzle, a water controlling valve located in said duct, a stationary frame, a frame pivotally connected at one end to said stationary frame, a lever pivotally connected at one end to said pivoted frame and adapted to bear at its opposite end upon the protruding stem of said valve, a hydraulic hoist for the pivoted frame, a water duct communicating from said water supply with said hoist, a valve controlling the flow of water through said last named duct, a tilting tank pivotally supported below said nozzle and adapted to be operated by the gravity of the water received from said keg, means for communicating motion from the pivotal support of said tilting tank to said last named valve, a duct communicating from said last named valve to said hoist beneath the piston therein, means for communicating motion from said piston to said pivoted frame, whereby as the cylinder of said hoist is filled with water, the front end of said pivoted frame with the keg thereon, will be raised, a link connected at one end to the rear end of said tilting lever and at its opposite end to said stationary frame, said link being adapted as the front end of said pivoted frame is raised to hold the rear end of said tilting lever, whereby its front end is thrown rearwardly with said keg, and the keg is thereby discharged from said frame, means actuated by the keg as it rolls from said pivoted frame for returning said tilting tank to its normal position, and means connected with the tank supporting shaft for reversing the movement of the valve leading to the hoist, whereby the water is permitted to escape from said hoist, and the piston therein is returned to its normal position by the gravity of said pivoted frame.

5. In a machine for rinsing kegs, the combination of a spray nozzle, a water duct communicating from the water supply to said nozzle, a water controlling valve located in said duct, a stationary frame, a frame pivotally connected at one end to said stationary frame, a lever pivotally connected at one end to said pivoted frame and adapted to bear at its opposite end upon the protruding stem of said valve, a hydraulic hoist for the pivoted frame, a water duct communicating from said water supply with said hoist, a valve controlling the flow of water through said last named duct, a tilting tank pivotally supported below said nozzle and adapted to be operated by the gravity of the water received from said keg, means for communicating motion from the pivotal support of said tilting tank to said last named valve, a duct communicating from said last named valve to said hoist beneath the piston therein, means for communicating motion from said piston to said pivoted frame, whereby as the cylinder of said hoist is filled with water, the front end of said pivoted frame with the keg thereon, will be raised, a link connected at one end to the rear end of said tilting lever and at its opposite end to said stationary frame, said link being adapted as the front end of said pivoted frame is raised to hold the rear end of said tilting lever, whereby its front end is thrown rearwardly with said keg, and the keg is thereby discharged from said frame, a two armed lever pivotally supported from said inclinable frame, the upper arm of said lever being located in the path of the keg as it passes over the pivoted frame and its opposite end being connected with said tilting tank, whereby as said keg is discharged from said machine, said two armed lever will be actuated, said tilting tank will be restored to its normal position, and means connected with the tank supporting shaft for reversing the movement of the valve leading to the hoist, whereby the water therein is permitted to escape and the piston is returned to its normal position by the gravity of said pivoted frame.

6. In a machine for rinsing kegs, the combination of a spray nozzle, a water duct communicating from the water supply to said nozzle, a water controlling valve located in said duct, a stationary frame, a frame pivotally connected at one end to said stationary frame, a lever pivotally connected at one end to said pivoted frame and adapted to bear at its opposite end upon the protruding stem of said valve, a hydraulic hoist for the pivoted frame, a water duct communicating from said water supply with said hoist, a valve controlling the flow of water through said last named duct, a tilting tank pivotally supported below said nozzle and adapted to be operated by the gravity of the water received from said keg, means for communicating motion from the pivotal support of said tilting tank to said last named valve, means for communicating motion from said piston to said pivoted frame, whereby as the cylinder of said hoist is filled with water, the front end of said pivoted frame with the keg thereon, will be raised, a link connected at one end to the rear end of said tilting lever and at its opposite end to said stationary frame, said link being adapted as the front end of said pivoted frame is raised to hold the rear end of said tilting lever, whereby its front end is thrown rearwardly with said keg, and the keg is thereby discharged from said frame, a two armed lever pivotally supported from said pivoted frame, the upper arm of said lever being located in the path of the keg as it passes over the pivoted frame and its opposite end being connected with said tilting tank, whereby as said keg is discharged from said machine, said two armed lever will be actuated, said tilting tank will be restored to its normal position, an arm connected with the tank supporting shaft, a two way valve, means for communicating motion from said arm to said two way valve, a duct communicating from said valve to said hoist, said valve being adapted as it is thrown in one direction by the movement of said tilting tank, to lead the water from the supply to said hoist, and as said valve is thrown in the opposite direction, by the movement of said tilting tank to open said valve, whereby the contents of said hoist is permitted to escape when the piston in said hoist is returned to its normal position by the gravity of said pivoted frame, all substantially as and for the purpose specified.

7. In a machine for rinsing kegs, the combination of a spray nozzle, a water duct communicating from the water supply to said nozzle, a water controlling valve located in said duct, a stationary frame, a frame pivotally connected at one end to said stationary frame, a lever pivotally connected at one end to said pivoted frame, and adapted to bear at its opposite end upon the protruding stem of said valve, a hydraulic hoist for the pivoted frame, a water duct communicating from said water supply with said hoist, a valve controlling the flow of water through said last named duct, a receptacle for water located below said nozzle, a tilting tank pivotally supported below said nozzle and adapted to be operated by the gravity of the water received from said keg, two water passages leading from said receptacle, one leading to said tilting tank and the other to a place of escape, means for controlling the relative quantities of water through said passages respectively, means for communicating motion from the pivotal support of said tilting tank to said last named valve, whereby as said tilting tank is operated by the gravity of water therein, said last named valve will be opened, said hoist will be actuated, one end of said pivoted frame will be elevated, and said keg will be discharged therefrom.

In testimony whereof I affix my signature in the presence of two witnesses.

GEORGE D. PRENTICE.

Witnesses:
 Jas. B. Erwin,
 R. L. Farrington.

---

Copies of this patent may be obtained for five cents each, by addressing the "Commissioner of Patents, Washington, D. C."